(12) United States Patent
Feddersen et al.

(10) Patent No.: US 11,214,378 B2
(45) Date of Patent: Jan. 4, 2022

(54) SYSTEM CONTROLLER FOR SERIES HYBRID POWERTRAIN

(71) Applicant: Zunum Aero, Inc., Bothell, WA (US)

(72) Inventors: Matthew Feddersen, Arlington Heights, IL (US); Waleed Said, Rockford, IL (US)

(73) Assignee: Zunum Aero, Inc., Bothell, WA (US)

( * ) Notice: Subject to any disclaimer, the term of this patent is extended or adjusted under 35 U.S.C. 154(b) by 0 days.

(21) Appl. No.: 16/107,821

(22) Filed: Aug. 21, 2018

(65) Prior Publication Data

US 2020/0062413 A1    Feb. 27, 2020

(51) Int. Cl.
*B64D 31/00*    (2006.01)
*B64D 27/02*    (2006.01)

(52) U.S. Cl.
CPC ............ *B64D 31/00* (2013.01); *B64D 27/02* (2013.01); *B64D 2027/026* (2013.01)

(58) Field of Classification Search
CPC ... B64D 31/00; B64D 27/02; B64D 2027/026
See application file for complete search history.

(56) References Cited

U.S. PATENT DOCUMENTS

| | | | |
|---|---|---|---|
| 9,376,208 B1 * | 6/2016 | Gentry | G08G 5/006 |
| 9,561,860 B2 | 2/2017 | Knapp et al. | |
| 10,322,824 B1 * | 6/2019 | Demont | H02J 7/1423 |
| 10,589,635 B1 | 3/2020 | Solodovnik et al. | |
| 2005/0052080 A1 | 3/2005 | Maslov et al. | |
| 2012/0025032 A1 | 2/2012 | Hopdjanian et al. | |
| 2012/0209456 A1 | 8/2012 | Harmon et al. | |
| 2016/0236790 A1 * | 8/2016 | Knapp | B64C 11/001 |
| 2016/0280386 A1 * | 9/2016 | Mestler | B64C 39/024 |
| 2016/0304211 A1 * | 10/2016 | Swann | B64D 27/24 |
| 2016/0368482 A1 | 12/2016 | Shahverdi et al. | |
| 2017/0029131 A1 * | 2/2017 | Steinwandel | B64C 39/024 |
| 2017/0057650 A1 * | 3/2017 | Walter-Robinson | B64D 41/00 |
| 2018/0079515 A1 * | 3/2018 | Harwood | H02P 5/74 |
| 2018/0201142 A1 | 7/2018 | Galin et al. | |
| 2018/0201384 A1 * | 7/2018 | Barth | B64D 27/24 |
| 2018/0244398 A1 * | 8/2018 | Woodhouse | B64D 41/00 |
| 2018/0273195 A1 * | 9/2018 | Woodhouse | G05D 1/105 |

(Continued)

FOREIGN PATENT DOCUMENTS

| | | |
|---|---|---|
| EP | 2441632 A1 | 4/2012 |
| EP | 2985901 A1 | 2/2016 |

(Continued)

OTHER PUBLICATIONS

Chapter II and Article 34 Amendment, App. No. PCT/US19/47114, Filed Jun. 19, 2020, 23 Pages.

(Continued)

*Primary Examiner* — Yazan A Soofi
*Assistant Examiner* — Naeem Taslim Alam
(74) *Attorney, Agent, or Firm* — Berkeley Law & Technology Group, LLP

(57) ABSTRACT

Briefly, example methods, apparatuses, and/or articles of manufacture are disclosed that may be implemented, in whole or in part, to facilitate and/or support one or more operations and/or techniques for a system controller for a series hybrid powertrain, such as employed for propulsion of a hybrid electric aircraft, for example.

23 Claims, 6 Drawing Sheets

(56) References Cited

U.S. PATENT DOCUMENTS

| | | | |
|---|---|---|---|
| 2018/0346139 A1* | 12/2018 | Ferran | B64D 31/06 |
| 2019/0002115 A1* | 1/2019 | Miller | B64D 35/08 |
| 2019/0168622 A1* | 6/2019 | McRoberts | H02J 7/1492 |
| 2019/0263519 A1* | 8/2019 | Argus | B64D 31/06 |
| 2020/0017225 A1* | 1/2020 | Chung | B64D 27/02 |
| 2020/0017228 A1* | 1/2020 | Combs | B64D 31/02 |
| 2020/0039657 A1* | 2/2020 | Ransom | H02K 7/14 |
| 2020/0055610 A1* | 2/2020 | Terwilliger | F02C 6/14 |
| 2020/0056549 A1* | 2/2020 | Terwilliger | F02C 9/18 |
| 2020/0180454 A1 | 6/2020 | Gao et al. | |

FOREIGN PATENT DOCUMENTS

| | | |
|---|---|---|
| FR | 3085667 A1 | 3/2020 |
| WO | 2016093905 A1 | 6/2016 |
| WO | 2018/009914 A2 | 1/2018 |

OTHER PUBLICATIONS

Communication pursuant to Rules 161(1) and 162 EPC, App. No. 19766382.6, dated Apr. 9, 2021, 3 Pages.

International Preliminary Report on Patentability, App. No. PCT/US2019/047114, Date of Completion of Report Dec. 7, 2020, 16 Pages.

Notification of Transmittal of the International Search Report and the Written Opinion of the International Searching Authority, or the Declaration, App. No. PCT/US2019/047114, dated Dec. 4, 2019, 1 Page.

International Search Report, App. No. PCT/US2019/047114, dated Dec. 4, 2019, 5 Pages.

Written Opinion of the International Searching Authority, App. No. PCT/US2019/047114, dated Dec. 4, 2019, 273 Pages.

Written Opinion of the International Preliminary Examining Authority, App. No. PCT/US2019/047114, dated Sep. 7, 2020, 5 Pages.

U.S. Appl. No. 16/717,902, filed Dec. 17, 2019, 52 Pages.

Filing Receipt and Notice to File Missing Parts , U.S. Appl. No. 16/717,902, dated Jan. 30, 2020, 5 Pages.

Response to Notice to File Missing Parts, U.S. Appl. No. 16/717,902, filed Jul. 21, 2020, 6 Pages.

Updated Filing Receipt and Informational Notice, U.S. Appl. No. 16/717,902, dated Jul. 23, 2020, 5 Pages.

Office Action, U.S. Appl. No. 16/717,902, dated Oct. 16, 2020, 7 Pages.

Response to Office Action, U.S. Appl. No. 16/717,902, filed Jan. 20, 2021, 23 Pages.

Final Office Action, U.S. Appl. No. 16/717,902, dated Apr. 30, 2021, 18 Pages.

Response to Communication pursuant to Rules R161(1) and R162 EPC, and the International Preliminary Report on Patentability, App. No. EP19766382.6, filed Oct. 18, 2021, 14 Pages.

\* cited by examiner

SYSTEM CONTROLLER FOR SERIES HYBRID POWERTRAIN

BACKGROUND

1. Field

The present disclosure relates generally to system controllers and, more particularly, to a system controller for a series hybrid powertrain that may be used, at least in part, to facilitate and/or support aircraft propulsion, for example.

2. Information

Typically, in a conventional aircraft, performance of an internal combustion engine (ICE), such as a gas turbine engine (e.g., a turbofan, turbojet, etc.), for example, is controlled by a dedicated propulsion control system, such as a Full Authority Digital Engine Control (FADEC) system. FADEC is typically a digital computer with a single or multiple channel configuration that receives and analyzes a limited number of information inputs, such as from a throttle lever, autopilot, engine, associated sensors, etc. and controls a fuel flow rate (e.g., air/fuel ratio, etc.) to the ICE for an appropriate thrust. In a hybrid electric aircraft, however, for powertrain control, a system controller may be employed. Thus, greater flexibility and/or variety of approaches for implementing a system controller, such as to control operation of a propulsion powertrain for a hybrid electric aircraft, for example, may, therefore, be desirable.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
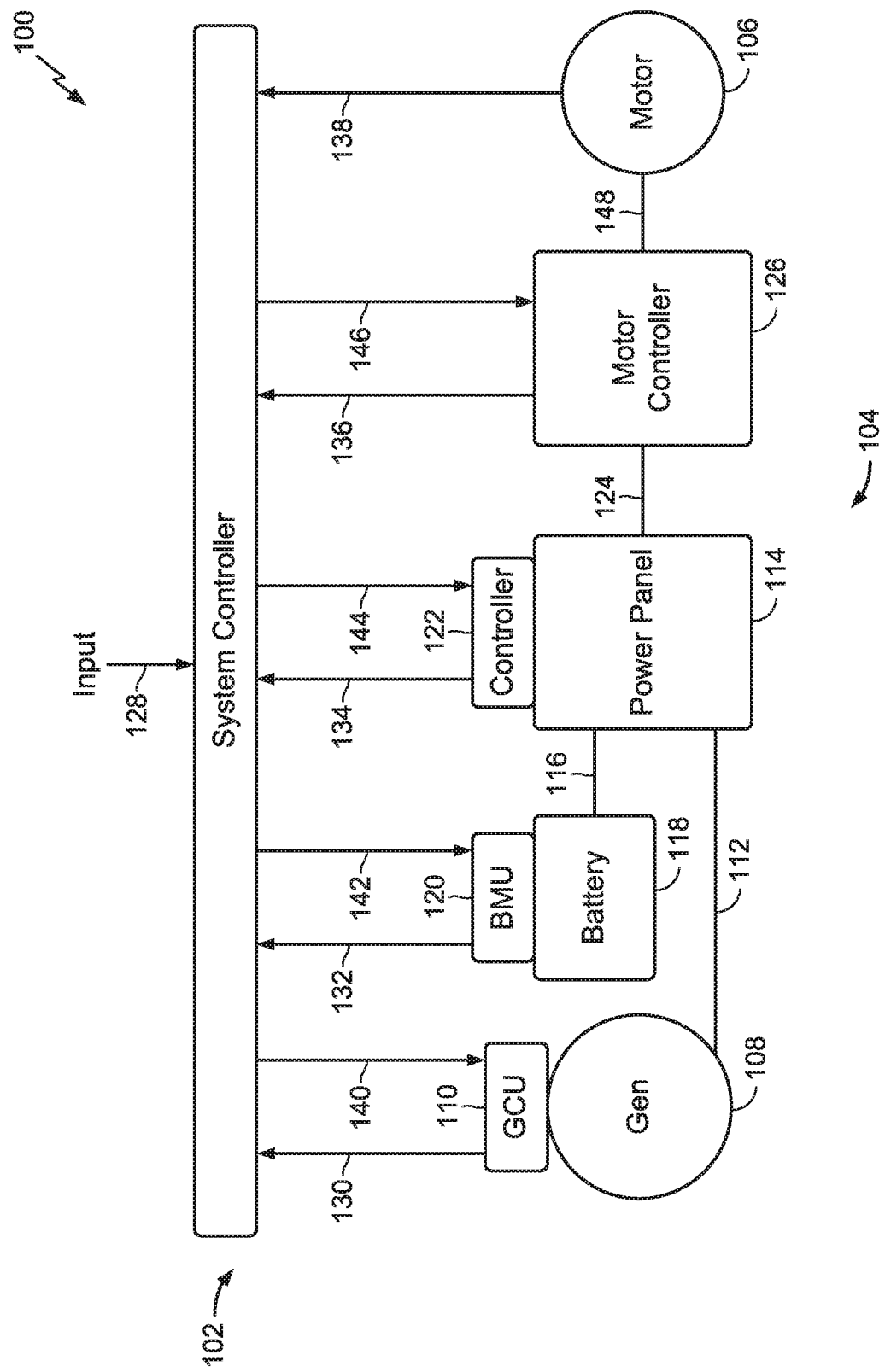
FIG. 1 is a schematic diagram illustrating features associated with an implementation of an example operating environment for a system controller for a series hybrid powertrain.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for a system controller capable of controlling operation of a propulsion powertrain for a hybrid electric aircraft, such as implemented in connection with one or more computing and/or communication links, networks, and/or protocols (e.g., computing protocols, etc.) discussed herein. A hybrid electric aircraft is typically a type of a hybrid aircraft that may integrate and/or combine one or more stored energy systems (e.g., batteries, etc.) with one or more electrical power generation systems (e.g., turbine-driven generators, etc.). As was indicated, in some instances, a hybrid electric aircraft may employ a propulsion powertrain, such as a series hybrid powertrain, for example, as a source of propulsive power. In this context, "series hybrid powertrain" refers to a system of components or elements capable of generating, receiving, conditioning, and/or distributing electrical power from one or more electrical energy sources in order to drive or operate a particular electrical machine that provides mechanical power for an associated propulsion system.

As will be seen, electrical energy sources may comprise, for example, a generated electrical energy source and a stored electrical energy source. To illustrate, depending on an implementation, a generated electrical energy source may comprise, for example, an electrical generator (e.g., turbine-driven, etc.), and a stored electrical energy source may comprise, for example, a battery. Thus, depending on a particular power demand, which may be based, at least in part, on specific sections of a flight (e.g., takeoff, cruise, landing, etc.), a particular electrical energy source may provide a primary electromotive force, for example, and, in some instances, other electrical energy source may augment the primary source in a suitable manner, such as implemented via a so-called "power split," as also discussed below. In general, it may be understood that a series hybrid propulsion powertrain may be intended to be referenced in a particular discussion, although in a particular context, the term "powertrain" may be employed, such as for ease of discussion.

As alluded to previously, in a conventional aircraft, one of primary functions of an engine controller is to regulate a flow of fuel to a propulsion engine in order to produce suitable thrust. As also indicated above, a typical aircraft engine controller, however, may not be applicable or otherwise useful to control an electromotive power flow in a series hybrid powertrain utilized by a hybrid electric aircraft as a source of propulsion. In some instances, a powertrain may be controlled, at least in part, on a sub-system or component level, such as via sampling a directional feedback from a particular generated electrical energy source and returning a command signal to the source to affect powertrain's performance in some manner, such as via leveraging generated power output, for example. At times, however, this or like approaches may be less dynamic, such as in terms of a suitable and/or desired response by a hybrid electric powertrain to particular and/or changing load demands, for example, which may affect aircraft propulsion and/or overall powertrain performance. Accordingly, it may be desirable to develop one or more methods, systems, and/or apparatuses that may more effectively and/or more efficiently implement a system controller for a series hybrid powertrain utilized by a hybrid electric aircraft as a source of propulsion, such as via one or more optimizations and/or improvements discussed herein.

For example, as will be seen, in some instances, one or more optimizations and/or improvements may include implementing and/or utilizing a feedback loop or like process outside of an internal control loop of a particular generated electrical energy source, which may facilitate and/or support more effective and/or more efficient powertrain performance and/or control. As will also be seen, at times, one or more optimizations and/or improvements may include, for example, more effectively and/or more efficiently implementing a "power split," such as to facilitate and/or support particular power demands. In this context, "power split" refers to a proportion of electrical power delivery between a stored electrical energy source (e.g., a battery, etc.) and a generated electrical energy source (e.g., an electrical generator, etc.). As also discussed below, in some instances, one or more optimizations and/or improvements may include, for example, more effectively and/or more efficiently implementing a desired "load power," such to facilitate and/or support production of appropriate thrust. In this context, "load power" refers to the amount of power consumption by a particular load, such as an electric motor, propulsor, or the like. At times, one or more optimizations and/or improvements may also include, for example, more effectively and/or more effectively detecting and/or isolating one or more faulty powertrain components or elements, as will also be seen.

Thus, as will be described in greater detail below, in an implementation, a system controller may, for example, control an operation of a series hybrid powertrain, such as via receiving a signal indicative of a particular input, performing one or more appropriate determinations and/or calculations, and communicating one or more appropriate commands, such as in response to the determinations and/or calculations. In some instances, a signal indicative of a particular input may comprise, for example, an electrical digital signal received from one or more powertrain elements or components (e.g., a battery, generator, etc.), a throttle lever (e.g., from a pilot, etc.), an auto-throttle lever (e.g., from an auto-pilot, etc.), and/or one or more other components, elements, modules, systems, etc. of a hybrid electric aircraft. For example, at times, a signal indicative of a particular input may be received from an aircraft management system responsible for flight planning, flight energy/cost optimization, and/or other higher-level tasks. A signal indicative of a particular input may comprise, for example, an electrical digital signal, such as communicated and/or received via one or more applicable communication links, buses, paths, networks, buses, electronic devices, etc. that may be operatively and/or communicatively coupled to and/or associated with a powertrain, aircraft management system, or the like. Particular examples of these or like signals, communications, inputs, etc. will be discussed in greater detail below.

As will also be seen, depending on an implementation, a particular input may comprise, for example, a command to implement a desired power split, load power, load speed, torque, etc. In some instances, a particular input may comprise, for example, one or more signal sample values obtained via one or more applicable sensors or like devices and indicative of current operating parameters of one or more powertrain elements or components (e.g., voltage, current, temperature, torque, speed, etc.). At times, a particular input may comprise, for example, propeller load tables, aircraft altitude, speed, etc., start/shutdown instructions, applicable lookup tables, and/or other suitable data that may be used, in whole or in part, to facilitate and/or support one or more operations and/or techniques for a system controller for a series hybrid powertrain.

As also discussed below, one or more determinations and/or calculations may include, for example, computing and/or adjusting one or more output values for a generated electrical energy source, such as for purposes of implementing a desired power split. For example, in some instances, a system controller may calculate a voltage setpoint value for a particular generated electrical energy source to implement, such as to meet and/or maintain. As will also be seen, at times, a voltage setpoint value may, for example, be computed as a function of one or more applicable parameters of a generated electrical energy source and associated electrical circuit (e.g., resistances, voltages, load power, generator power, etc.). A voltage setpoint value may be refined or adjusted, such as via an appropriate feedback process, which may include, for example, a Proportional Integral (PI), Proportional Integral Derivative (PID), or like control loop utilizing generator output power as a process variable.

In some instances, one or more determinations and/or calculations may include, for example, computing and/or adjusting one or more output values for a particular load, such as an electric motor, propulsor, etc., so as to achieve desired power. For example, a system controller may calculate a speed setpoint value for an electric motor, propulsor, etc. to implement, such as to meet and/or maintain. At times, a system controller may, for example, calculate a torque setpoint value for an electric motor, propulsor, etc. to implement, such as to meet and/or maintain. In some instances, a setpoint value for speed and/or torque may, for example, be calculated using an internal model of a particular load allowing to input power and receive speed or torque as output.

At times, one or more determinations and/or calculations may include, for example, identifying one or more powertrain elements or components that may be faulty. For example, a system controller may determine whether one or more current operating parameters of one or more powertrain elements or components are within predetermined thresholds or limits, such as corresponding to their safe operation. In some instances, based, at least in part, on such a determination, a system controller may, for example, reduce an operating capability of a particular element or component of a powertrain or, optionally or alternatively, may isolate such an element or component completely. Again, particular examples of determinations, computations, processes, etc. that may be performed by a system controller, such as to facilitate and/or support one or more operations and/or techniques for controlling operation of a hybrid electric powertrain, for example, will be discussed in greater detail below.

Referring now to FIG. 1, which is a schematic diagram illustrating features associated with an example operating environment 100 capable of facilitating and/or supporting one or more processes and/or operations for a system controller, such as an example system controller illustrated generally at 102. As was indicated, in some instances, system controller 102 may be capable of controlling an operation of a powertrain, such as a series hybrid powertrain, for example, referenced generally via an arrow at 104. As was also indicated, series hybrid powertrain 104 may, for example, be employed, in whole or in part, as a source of propulsive power for a hybrid electric aircraft. It should be noted that information acquired and/or produced, such as, for example, input signals, output signals, operations, results, etc. associated with example operating environment 100 may be represented via one or more digital signals. It should also be noted that even though one or more communications and/or operations are illustrated or described concurrently or with respect to a certain sequence, other sequences or concurrent communications and/or operations may be employed. In addition, although the description below references particular aspects and/or features illustrated in certain other figures, one or more operations may be performed with other aspects and/or features. Further, it should be appreciated that operating environment 100 is described herein as a non-limiting example that may be implemented, in whole or in part, in the context of various electronic communications networks or combination of such networks, such as wired networks, wireless networks, etc., or any combination thereof.

Thus, as illustrated, according to an implementation, powertrain 104 may comprise, for example, a number of elements or components capable of generating, receiving, conditioning, and/or distributing electrical power from one or more electrical energy sources, such as to drive or operate a particular electrical machine that provides mechanical power for an associated propulsion system. As seen in this particular example, a particular electrical machine may comprise, for example, an electric motor, referenced at 106, that may provide mechanical power for an associated propeller, ducted fan, etc. (not shown). It should be noted that even though a certain number of elements or components of powertrain 104 are illustrated herein, any number of suitable elements or components may be implemented to facilitate and/or support one or more operations and/or techniques associated with example operating environment 100.

In addition, it should be appreciated that even though a single powertrain is illustrated herein, such as for ease of discussion, any suitable number of powertrains may be employed herein. For example, in some instances, there may be at least one additional series hybrid powertrain associated with example operating environment 100. An additional series hybrid powertrain may, for example, mirror series hybrid powertrain 104 and/or may comprise the same or similar elements or components operatively and/or communicatively coupled to system controller 102, such as in the same or similar manner. An additional series hybrid powertrain may, for example, be implemented to power another electrical machine, to improve reliability, to address and/or mitigate a risk of failure via redundancy, or the like. As a way of illustration, a hybrid electric aircraft may comprise, for example, two series hybrid powertrains of the same or similar configuration that may be positioned on the right and left sides of the aircraft, such as to respectively power two electric motors in the same or similar manner. In such a case, system controller 102 may, for example, be capable of controlling operations of two powertrains, such as in the same and/or similar manner. Also, even though system controller 102 is illustrated schematically in connection with a single communication bus, any suitable number of communication buses, redundant or otherwise, may be implemented herein, such as to facilitate and/or support one or more operations and/or techniques associated with example operating environment 100.

Thus, according to an implementation, series hybrid powertrain 104 may comprise, for example, a generated electrical energy source, referenced generally at 108. In this example implementation, generated electrical energy source 108 may comprise, for example, a turbine-driven (e.g., gas, steam, etc.) electric generator capable of converting mechanical input from an associated combustion engine into electrical energy, such as via electromagnetic induction. As also seen, generated electrical energy source 108 may have, for example, an associated or built-in controller, referenced as a generator control unit (GCU) at 110. GCU 110 may, for example, be capable of controlling an operation of generated electrical energy source 108, such as on a sub-system level via monitoring one or more applicable parameters (e.g., speed, voltage, current, etc.) of generated electrical energy source 108 and/or communicating appropriate commands to generated electrical energy source 108 and/or system controller 102. GCU 110, as well as other controllers or like devices discussed herein, may be implemented via any suitable technology, such as, for example, programmable integrated circuits, logic chips, control circuitry, arrays, etc. capable of facilitating and/or supporting one or more operations and/or techniques associated with example operating environment 100.

In an implementation, as illustrated generally via a power flow path at 112, generated electrical energy source 108 may, for example, be electrically coupled to a power panel 114, discussed in greater detail below. As also seen, powertrain 104 may further comprise, for example, a stored electrical energy source, referenced at 118, that may also be electrically coupled to power panel 114, such as via a power flow path illustrated generally at 116, for example. For this particular implementation, stored electrical energy source 118 may comprise, for example, a battery, which may be in the form of a rechargeable battery pack, as one possible example. As also illustrated, in some instances, stored electrical energy source 118 may include, for example, its own controller, such as referenced generally via a battery management unit (BMU) at 120. At times, BMU 120 may, for example, control a flow of electric power from stored electrical energy source 118 to power panel 114, such as via power flow path 116.

In an implementation, power panel 114 may comprise, for example, an electrical component or element having a matrix of controllable electrical switches with associated conductive paths so as to control delivery and/or distribution of electric power within powertrain 104, such as via routing electric power from one or more applicable inputs to one or more applicable outputs. Thus, as illustrated, power panel 114 may comprise a controller, referenced at 122, which may be capable of implementing a particular switching configuration of power panel 114, such as responsive to an appropriate command by system controller 102, for example. In some instances, a particular switching configuration may, for example, be implemented via turning on and/or off one or more electrical switches (and/or associated conductive paths) of power panel 114. For example, responsive to a command by system controller 102, controller 122 may implement a particular switching configuration of power panel 114 via routing electric power from generated electrical energy source 108 to electric motor 106, while isolating stored electrical energy source 118, just to illustrate one possible implementation. In some instances, controller 122 may also be capable of detecting operating parameters, conditions, faults, etc. of electrical switches, conductive paths, etc. of power panel 114.

As further referenced via a power flow path at 124, in an implementation, electric power from power panel 114 may, for example, be routed and/or delivered, as appropriate, to electric motor 106, suitable operation of which may be controlled by a motor controller 126. As was indicated, electric motor 106 may, for example, convert electric power into mechanical energy, such as to facilitate and/or support appropriate thrust for a hybrid electric aircraft. Thus, electric motor 106 may be mechanically coupled to a suitable propulsor, such as a ducted fan, propeller, etc., for example, capable of generating such thrust. Depending on an implementation, motor controller 126 may comprise, for example, a stand-alone unit communicatively coupled to motor 106, such as via a link 148, though claimed subject matter is not so limited. For example, in some instances, motor controller 126 may be part of electric motor 106 (e.g., built-in, etc.). Motor controller 126 may, for example, be capable of controlling speed and/or torque of electric motor 106, communicating one or more operating parameters of electric motor 106 to system controller 102, determining health of electric motor 106, or the like. Although not shown, in some instances, motor controller 126 may comprise and/or be associated with an inverter, such as for purposes of changing direct current (DC) into alternating current (AC), for example. An inverter may be implemented in any suitable manner, such as having suitable computing and/or processing resources (e.g., programmable chips, circuitry, memory, etc.), for example, to facilitate and/or support an appropriate control process and/or more intelligent inverter operation.

As illustrated via a number of communication links, in an implementation, system controller 102 may, for example, receive a signal that may be indicative of a particular input and/or may provide one or more commands, such as in response to the input, as was indicated. For example, as referenced via a communication link at 128, system controller 102 may receive a signal indicative of a particular input from a throttle lever (e.g., from a pilot, etc.), auto-throttle lever (e.g., from an auto-pilot, etc.), an aircraft management system, and/or other systems of a hybrid electric aircraft. As was also indicated, depending on an implementation, a particular input may, for example, be indicative of a desired power split, load power, load speed, aircraft-related data (e.g., propeller load tables, altitude, speed, etc.), start/shutdown commands, or the like. As also illustrated, system controller 102 may, for example, receive a signal indicative of a particular input from one or more elements or components of powertrain 104. For example, system controller 102 may receive a signal from GCU 110 that may be indicative of one or more operating parameters, such as voltage, current, temperature, load, etc. of generated electrical energy source 108, such as via a communication link 130, for example.

Further, according to an implementation, system controller 102 may, for example, receive a signal from BMU 120 that may be indicative of a pressure inside stored electrical energy source 118 and/or associated compartment, if applicable, as well as one or more operating parameters, such as voltage, current, temperature, state of charge, etc. of stored electrical energy source 118, such as via a communication link 132. Likewise, via a communication link 134, system controller 102 may, for example, receive a signal indicative of a switching configuration of power panel 114, operating condition of controllable switches and/or conductive paths, such as temperature, faults, current, or the like. As also seen, motor controller 126 and/or electric motor 106 may, for example, communicate a signal indicative of voltage, current, temperature, faults, shaft position, speed, torque, etc., which may be received by system controller 102 via communications links 136 and/or 138, as applicable.

As was indicated, in an implementation, system controller 102 may, for example, also provide one or more commands to one or more applicable elements or components of series hybrid powertrain 102, likewise, via a particular signal transmitted over one or more communication links. For example, utilizing a communication link 140, system controller 102 may communicate to GCU 110 a command regarding operation of generated electrical energy source 108, such as desired output voltage, load, etc. At times, system controller 102 may communicate a command to GCU 110 to start or shutdown generated electrical energy source 108, for example. As further illustrated via communication links 142, 144, and 146, system controller 102 may, for example, communicate a number of applicable commands to a number of elements or components of series hybrid powertrain 102, such as to facilitate and/or support proper operation of these or like elements or components of series hybrid powertrain 102.

For example, according to an implementation, system controller 102 may communicate to BMU 120 a command to disconnect stored electrical energy source 118 from one or more applicable elements or components of series hybrid powertrain 102, and/or other systems of an aircraft, if applicable. To illustrate, if a signal received from BMU 120 (e.g., via communication link 132, etc.) indicates that the temperature of stored electrical energy source 118 is outside of some safe operating limit (e.g., too high, etc.), for example, system controller 102 may communicate a command (e.g., via a communication link 142, etc.) to disconnect stored electrical energy source 118 from power panel 114, as one possible example. As another example, system controller may also communicate a command to disconnect stored electrical energy source 118 if a signal from BMU 120 (e.g., communicated via link 132, etc.) indicates that a state of charge of stored electrical energy source 118 is too low, for example, such as to prevent irreversible degradation of stored electrical energy source 118. In an implementation, a communication to power panel 114 may comprise, for example, a command to turn one or more associated switches on or off, such as to achieve a particular switching configuration in order to facilitate and/or support suitable operation of powertrain 104. A communication to motor controller 126 may comprise a command to increase, decrease, etc. speed of electric motor 106, such as, for example, in response to applicable input.

Thus, in operative use, system controller 102 may interface with a pilot cockpit, aircraft management system, and/or one or more elements or components of powertrain 104, such as via one or more appropriate communications. For example, system controller 102 may receive a signal indicative of a particular input from these or like systems, elements or components, and may perform one or more determinations and/or computations, such as based, at least in part, on the input. For example, as discussed below, system controller 102 may compute one or more values so as to achieve a desired proportion of power delivery between stored electrical energy source 118 and generated electrical energy source 108. System controller 102 may also compute one or more values to achieve a desired amount of power consumption by electric motor 106, for example. In addition, system controller 102 may, for example, make one or more determinations with respect to health of one or more elements or components of powertrain 104 and/or their operating capability, as will also be seen. It should be noted that, depending on an implementation and/or context, communication links 128 and 138 may indicate a one-directional flow, bi-directional flow, or any combination thereof, such as with respect to signals, inputs, commands, or the like.

Figure 2:
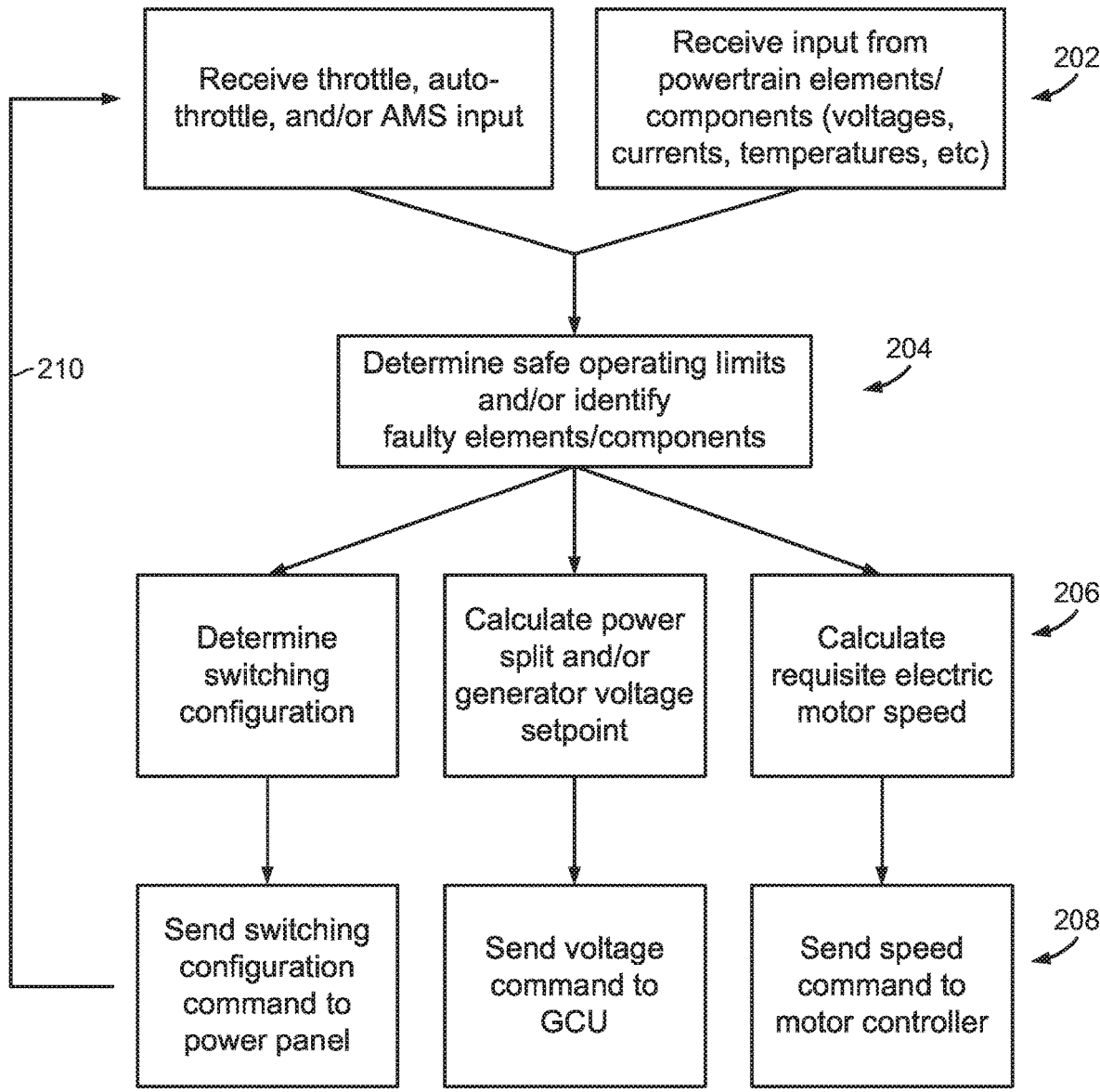
FIG. 2 is a flow diagram illustrating an implementation of an example process for a system controller for a series hybrid powertrain.

With this in mind, attention is now drawn to FIG. 2, which is a flow diagram illustrating an implementation of an example process 200 that may be performed, in whole or in part, to facilitate and/or support one or more operations and/or techniques for a system controller, such as system controller 102 of FIG. 1, for example, that may be capable of controlling operation of a propulsion powertrain for a hybrid electric aircraft, such as series hybrid powertrain 104 of FIG. 1, for example. It should be noted that information acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, example process 200 may, for example, begin at operation 202 with receiving a signal indicative of a particular input. For example, as seen and as indicated above, a signal indicative of a particular input may be received from a throttle lever (e.g., a pilot, etc.), auto-throttle lever (e.g., an auto-pilot, etc.), aircraft management system (AMS), and/or one or more elements or components of a series hybrid powertrain, or any combination thereof. A signal indicative of a particular input may, for example, be received via one or more applicable communication links, channels, networks, buses, electronic devices, etc. that may be operatively and/or communicatively coupled to and/or associated with a series hybrid powertrain, aircraft management system, or the like. As was also indicated, a particular input may comprise, for example, a command to implement a desired power split, load power, load speed, torque, etc. In some instances, a particular input may comprise, for example, one or more signal sample values obtained via one or more applicable sensors or like devices and indicative of current operating parameters of one or more powertrain elements or components (e.g., voltage, current, temperature, torque, speed, etc.). At times, a particular input may comprise, for example, propeller load tables, aircraft altitude, speed, etc., start/shutdown instructions, applicable lookup tables, and/or other suitable data that may be used, in whole or in part, to facilitate and/or support one or more operations and/or techniques for a system controller for a series hybrid powertrain.

With regard to operation 204, one or more safe operating limits, such as for one or more elements or components of a powertrain may be determined, for example, and/or one or more faulty elements or components of the powertrain may be identified, which may be based, at least in part, on such a determination. Depending on an implementation, one or more safe operating limits may be represented via one or more appropriate thresholds and/or ranges, such as referenced via one or more parameter values that may be dynamically established and/or pre-defined based, at least in part, on a specific section of a flight (e.g., takeoff, cruise, landing, etc.), element or component, applicable model, etc. In some instances, safe operating limits may be pre-loaded into a system controller, such as to be stored as one or more digital signals and/or states in a memory associated with (e.g., part of, etc.) and/or accessible (e.g., via a bus, etc.) by the system controller, for example. Safe operating limits may be in the form of any suitable data structure, such as, for example, a lookup table (e.g., a digital file, hard-coded software, etc.) comprising an array or matrix of values representing parameters of interest, just to illustrate one possible implementation.

In an implementation, a system controller may, for example, access such a data structure and may determine whether an element or component of interest is within its safe operating envelope, such as in terms of its thermal, electrical, lifetime, or like operating parameters. At times, such as a determination may, for example, be made, at least in part, by comparing one or more signal sample values corresponding to one or more current operating parameters of interest with one or more applicable thresholds determined for such parameters and stored in a data structure. One or more signal sample values corresponding to one or more current operating parameters of interest may, for example, be electronically provided to a system controller by one or more elements or components of a powertrain, such as sub-system-level controllers (e.g., GCU 110, BMU 120, controllers 122, 126, etc. of FIG. 1, etc.). Depending on an implementation, one or more signal sample values corresponding to one or more current operating parameters of interest may be provided to a system controller upon request, periodically, continually, etc. As a way of illustration, one or more signal sample values corresponding to one or more current operating parameters of interest may, for example, be communicated to a system controller in real time or near real time. In this context, "real time" refers to an amount of timeliness of data, which may have been delayed by, for example, an amount of time attributable to electronic communication and/or signal processing.

Optionally or alternatively, a determination whether one or more elements or components of a powertrain are operating within safe limits may be made on a sub-system level, such as by one or more sub-system-level controllers, for example, and subsequently communicated to a system controller, such as via one or more applicable communication links (e.g., links 130, 132, 134, 136, 138, etc. of FIG. 1, etc.). For example, at times, one or more sub-system-level controllers may be capable of comparing one or more current operating parameters of interest with one or more applicable thresholds to determine whether a particular element or component of interest is within its safe operating envelope, such as in a similar manner. Likewise, here, one or more safe operating limits may be pre-loaded and/or stored as one or more digital signals and/or states in a memory associated with and/or accessible by one or more sub-system-level controllers. Depending on an implementation, these or like communications and/or determinations by sub-system-level controllers may, for example, be performed in response to a command from a system controller, continually, periodically, etc., or any combination thereof.

Thus, continuing with the above discussion, in some instances, such as having determined safe operating limits, for example, one or more faulty elements or components of a powertrain may be identified. For example, at times, such elements or components may be identified based, at least in part, on a signal indicative of a particular input, such as received from one or more elements or components of a powertrain, as discussed above in connection with operation 202. Such an input may comprise status data from one or more sub-system-level controllers regarding operation of associated elements or component, such as thermal information, electrical information, operating time, catastrophic events, faults, predictive information (e.g., a likelihood of failing, time of potential failing, etc.), or the like. Based, at least in part, on this of like information, a system controller may, for example, utilize one or more applicable values representing safe operating limits for one or more elements or components of interest, such as discussed above, and may identify one or more faulty and/or failing elements or components of a powertrain. For example, as was indicated, a system controller may access an applicable data structure and may determine whether an element or component of interest is within its safe operating envelope, such as in terms of its thermal, electrical, lifetime, or like operating limits.

In some instances, having identified one or more faulty elements or components, a system controller may, for example, reduce or limit a performance capability of such elements or components (and may inform an aircraft management or like system) in a suitable manner or, optionally or alternatively, may isolate such elements or components completely. For example, a particular element or component of a powertrain may be isolated via a command by a system controller to an applicable power panel (e.g., power panel 114 of FIG. 1, etc.) instructing the power panel to implement a particular switching configuration so as to electrically isolate (e.g., switch off, etc.) such an element or component. A performance capability of a faulty element or component may, for example, be limited by communicating a command to an applicable controller to decrease or adjust one or more operating parameters, output, etc. of such an element or component. To illustrate, in some instances, a system controller may communicate a command to an applicable motor controller (e.g., motor controller 126 of FIG. 1, etc.), for example, to decrease allowed current, such as to reduce or prevent temperature increase, overheating, etc. As another example, a system controller may communicate a command to an applicable GCU (e.g., GCU 110 of FIG. 1, etc.), for example, to decrease allowed speed of an associated generator, such as to reduce or prevent vibration. Optionally or alternatively, a sub-system-level controller may limit its performance capability, such as to maintain safety, lifetime, etc., for example. In such a case, a sub-system-level controller may notify a system controller of its limited capability via one or more appropriate communications (e.g., via link 130, 136, etc. of FIG. 1, etc.).

In some instances, a system controller may also force a particular element or component of a powertrain to exceed its performance capability, such as via communicating a command to operate (e.g. temporarily, etc.) outside of its safe operating limits. In some instances, such a command may, for example, be based, at least in part, on a particular input received from one or more elements or components of a powertrain, aircraft management system, as well as one or more applicable models and/or statistical data. For example, a system controller may be provided with knowledge of component failure statistics, flight durations, element performance models, etc., which may be pre-loaded and/or stored in an accessible memory, communicated by an aircraft management system in real or near-real time, etc. as one or more signals and/or states. Thus, at times, a system controller may, for example, utilize such knowledge to make one or more assessments and/or determinations regarding exceeding a performance capability of a particular element or component. For example, a system controller may be provided with knowledge that mean time between failure (MTBF) for an electric motor is X number of cycles at 200 degrees Celsius, that internal settings for the motor will limit its performance at 200 degrees Celsius, and that the absolute maximum temperature is 250 degrees Celsius. A system controller may also determine that the electric motor is currently operating at 210 degrees Celsius due to an under-performing thermal system, for example, and have experienced only 10% of the X cycles to the MTBF. A system controller may also be provided with knowledge that an aircraft is about to land and has no more than five minutes of flight time. Here, a system controller may, for example, analyze applicable data and may determine that a likelihood of occurrence of a catastrophic event, such as motor overheating and/or failing, for example, during a duration of a flight (e.g., five minutes) is low or within an acceptable range. As such, a system controller may, for example, communicate a command to a motor controller to continue operating the electric motor despite a rising temperature, such as instead of performing the default limitation. Claimed subject matter is not so limited to this particular example, of course.

At operation 206, one or more calculations and/or determinations may, for example, be made and/or implemented, such as by a system controller. For example, as seen, here, a switching configuration may, for example, be determined, such as for a power panel. In this context, "switching configuration" refers to a particular arrangement of electrical switches within an electricity distribution device, such as a power panel, for example, so as to route electric power from one or more powertrain inputs to one of more powertrain outputs. A system controller may, for example, determine whether a current switching configuration (e.g., position of controllable switches, etc.) of a power panel comprises a preferred switching configuration. In this context, "preferred switching configuration" refers to a switching configuration suitable and/or sufficient to achieve desired powertrain performance. For example, a preferred switching configuration may be implemented to achieve a desired thrust, improve and/or remedy performance or operation of one or more elements or components of a powertrain, aircraft management system, or the like. To illustrate, a system controller may, for example, determine whether a current switching configuration comprises a preferred switching configuration, such as isolates a faulty element or component of a powertrain, routes electric power in accordance with a commanded power split, or the like. At times, a determination regarding a current switching configuration of a power panel may involve, for example, determining which inputs are currently connected to which outputs, positions of controllable switches, status of conductive paths, or the like. As was indicated, a switching configuration of a power panel may, for example, be implemented and/or changed based, at least in part, on received input (e.g., at operation 202, etc.), presence of faulty elements of components (e.g., at operation 204, etc.), etc., such as determined, at least in part, via one or more applicable communications discussed herein.

As also illustrated, in some instances, here, a power split and/or a generator voltage setpoint may, for example, be calculated and/or implemented. As was indicated, a power split may be descriptive of a balance or allocation of electric power between a plurality of power generation sources, for example, and may be represented via any suitable numerical reference, such as a percentage, ratio, or the like. For example, at times, a power split may be represented as a balance of generated electric power in relation to stored electric power, such as 70% generator power and 30% battery power, just to illustrate one possible implementation, meaning that, of total propulsive and/or non-propulsive power, a generator will be outputting 70% of generated power, while a battery output will be at 30%. In some instances, for such a representation, a particular power generation source may, for example, be used as a reference. For example, a power split referring to 25% battery power, such as if a generated power source and a stored power source are used, may indicate that 75% of total propulsive and/or non-propulsive power will be taken from the generated power source. Thus, if a charging state of a particular stored electrical energy source is low, for example, such as determined via one or more communications discussed above, then a power split may be calculated to favor a generated electrical energy source outputting more power (or all power) than the stored electrical energy source. Of course, these are merely examples to which claimed subject matter is not limited.

In some instances, a power split may, for example, be implemented in response to one or more commands. For example, an aircraft management system may communicate a command indicating a desired power split for a system controller to implement, such as represented via a particular numerical reference, as discussed above. Such a reference may, for example, be based, at least in part, on power demand accounting for a specific section of a flight (e.g., takeoff, cruise, landing, etc.), one or more operating parameters or elements of a powertrain, determined safe operating limits, presence of one or more faulty elements or components, or the like. A difference in voltage between generated energy power and stored energy power may determine how much power comes from each source. In some instances, a power split may, for example, be affected by physical and/or electrical properties in generated energy power and stored energy power, as well as wiring and/or conductive paths connecting these sources. If a generated electrical energy source outputs a higher voltage than a stored electrical energy source and these two sources are serving the same load together, then the generated electrical energy source is more likely to deliver more power to the load. Since voltage of a stored electrical energy source is typically not controllable, but will typically decrease over time as a charge is depleted, a desired power split may, for example, be implemented via setting and/or maintaining voltage of a generated electrical energy source, such as via a voltage setpoint value. In this context, "voltage setpoint" refers to a desired voltage, such as represented via a numerical reference, for example, that a generated electrical energy source is to implement, such as to meet and/or maintain. As discussed below, a voltage setpoint value may, for example, be calculated based, at least in part, on a linear circuit model or function accounting for applicable system parameters of a particular powertrain, such as resistance in a battery, resistance in feeders between a generator and power panel, state of charge of a battery, load power, generator power, etc. A voltage setpoint value may be modified, such as, for example, via a feedback process using generator output power as a process variable, as also discussed below.

Thus, more specifically, in an implementation, power parameters that may be given to a system controller as commands, such as a power split (Power_split), load power (Load_power), generated energy power (gen_power), and stored energy power (batt_power) may be related, such that if any two of these parameters are given, the other two parameters may be calculated. For example, a relationship between these parameters may be captured as:

Load_power=gen_power+batt_power

Power_split=gen_power/total_power, or

Power_split=gen_power/batt_power, or

Power_split=batt_power/total_power, or

As was indicated, according to an implementation, requisite voltage $V_2$ for a generated electrical energy source, such as to implement a desired power split, for example, may be computed as a function of applicable circuit parameters, such as resistances, voltages, load power, and/or generator power. Thus, consider, for example:

$$V_2 = V_1 - K_p I_L R_1 + (1 - K_p) I_L R_2 \qquad (1)$$

in which $$P_1 = V_1 I_1$$

$$P_2 = V_2 I_2$$

$$P_L = P_1 + P_2$$

$$I_L = I_1 + I_2$$

$$K_p = \frac{P_1}{P_L}$$

$$I_L = \frac{V_1 - \sqrt{V_1^2 4 K_p R_1 P_L}}{2 K_p R_1}$$

where $V_1$ denotes battery internal voltage; $R_1$ denotes battery internal resistance; denotes battery output current; $V_2$ denotes generator voltage (e.g., after rectifier); $R_2$ denotes generator/feeder resistance; $I_2$ denotes generator output current; $I_L$ denotes current to load; $K_p$ denotes a proportion of desired battery power compared to total delivered power; $P_1$ denotes battery power; $P_2$ denotes generator power; and $P_L$ denotes total delivered power.

Here, $P_1$, $P_2$, $P_L$ and $K_p$ denote four related power parameters, as was indicated, and if any two are given, the other two may be derived, such as via the above relations. Once all four parameters are computed, requisite voltage for a generated electrical energy source may, for example, be calculated, such as using Relation (1) above. As discussed below, in some instances, a voltage setpoint value computed via Relation (1) may be refined or modified via a feedback process, such as utilizing generator output power as a process variable. Optionally or alternatively, one or more appropriate voltage setpoint values may be modeled and/or determined experimentally and may be stored in a suitable data structure, such as a lookup table or like precalculated data structure stored in a memory associated with or accessible by a system controller.

It should be noted that, in some instances, $K_P$ may be defined as, for example:

$$K_p = \frac{P_2}{P_L} \text{ or } K_p = \frac{P_1}{P_2} \text{ or } K_p = \frac{P_2}{P_1}$$

Here, depending on a definition, Relation (1) may be modified or adjusted appropriately, such as, for example, utilizing a linear circuit model and solving for generated energy voltage in a similar manner.

In addition, in some instances, one or more models of elements or components of a powertrain may be used, in whole or in part, to modify or adjust Relation (1). Thus, at times, one or more of the following models may, for example, be employed:

One or more appropriate battery electrochemical models of voltage as functions of lifecycle, output current accumulation, resistance and temperature. Thus, consider, for example:

$R=f(\text{Temp,lifetime}); C=f(\text{Temp,current,SOC})$

For one or more state of charge (SOC) estimating or modeling approaches, see, e.g., Rivera-Barrera et al. SOC Estimation for Lithium-ion Batteries: Review and Future Challenges (2017).

One or more appropriate electrical models of feeder line resistance as functions of material, temperature, and geometry. Here, one or more known resistance functions of temperature, material, cross sectional area may, for example, be used, in whole or in part, or otherwise considered.

One or more appropriate generator electrical models of resistance, inductance, electromotive force, and field constants. Here, one or more known models of generator as linear circuit with counter or back electromotive force (EMF), resistance, inductance, and field constants may, for example, be used, in whole or in part, or otherwise considered.

One or more appropriate generator physical models of inertia and windage. Here, one or more known physics equations to balance torque, to predict dynamic response, etc. may, for example, be used, in whole or in part, or otherwise considered. For example, generated torque from electric motor, opposing torque from load, opposing damping torque from windage and viscous friction, opposing torque from rotational inertia and change in rotational velocity, or like dynamics may be used, in whole or in part, to refine the above relation (e.g., add to zero, etc.).

Depending on an implementation, these or like models may, for example, be realized in a system controller as resident and/or accessible software, one or more applicable values, algorithms, compiled code from a computer simulation, trained artificial neural network, appropriate data structure (e.g., lookup table, etc.), or the like.

As further illustrated, here, a requisite electric motor speed, such as to facilitate and/or support appropriate thrust for a hybrid electric aircraft may, for example, be calculated.

A motor speed may, for example, be calculated in response to a load power command, such as from an aircraft management system. As indicated above, since load power is directly related to speed of a shaft of an electric motor, in some instances, an internal model of an electric motor may, for example, be utilized, in whole or in part, which may allow to input load power and receive speed as output. As will be discussed below, in at least one implementation, a requisite electric motor speed may be represented via a setpoint value calculated and/or set via a process employing load power as a process variable and generating an error function utilized by a feedback process. Optionally or alternatively, a requisite motor speed may be commanded by an aircraft management or like system, such as via a signal communicated directly to an applicable sub-system-level controller (e.g., motor controller 126 of FIG. 1, etc.), or a via a system controller, which may provide a desired electric motor speed value to the sub-system-level controller.

With regard to operation 208, one or more commands may, for example, be communicated to one or more applicable elements or components of a series hybrid powertrain. For example, as illustrated, in some instances, a switching configuration command may be communicated to a controller of a power panel (e.g., controller 122 of FIG. 1, etc.), such as to route power flow from one or more applicable power sources to one or more elements or components of a powertrain, aircraft management system, etc., as discussed above. As was indicated, such a command may, for example, be communicated via an applicable signal utilizing an applicable communication link between a system controller and a controller of a power panel (e.g., link 144 of FIG. 1, etc.). Likewise, a voltage command indicating, for example, a calculated voltage setpoint value to be met and/or maintained by a generated electrical energy source may be communicated to an applicable sub-system-level controller (e.g., GCU 110 of FIG. 1, etc.), such as via an applicable communication link (e.g., link 140 of FIG. 1, etc.), as also discussed above. As also seen, at times, a command may also be communicated to an applicable motor controller (e.g., motor controller 126 of FIG. 1, etc.) via an applicable communication link (e.g., link 146 of FIG. 1, etc.), such as to meet and/or maintain a desired motor speed, for example.

As referenced via an arrow at 210, process 200 may loop back to operation 202, for example, and may proceed through operations 204, 206, and/or 208 any suitable number of times, such as to implement one or more associated determinations, calculations, communications, commands, etc., as appropriate and as discussed above, such as in a similar fashion.

Figure 3:
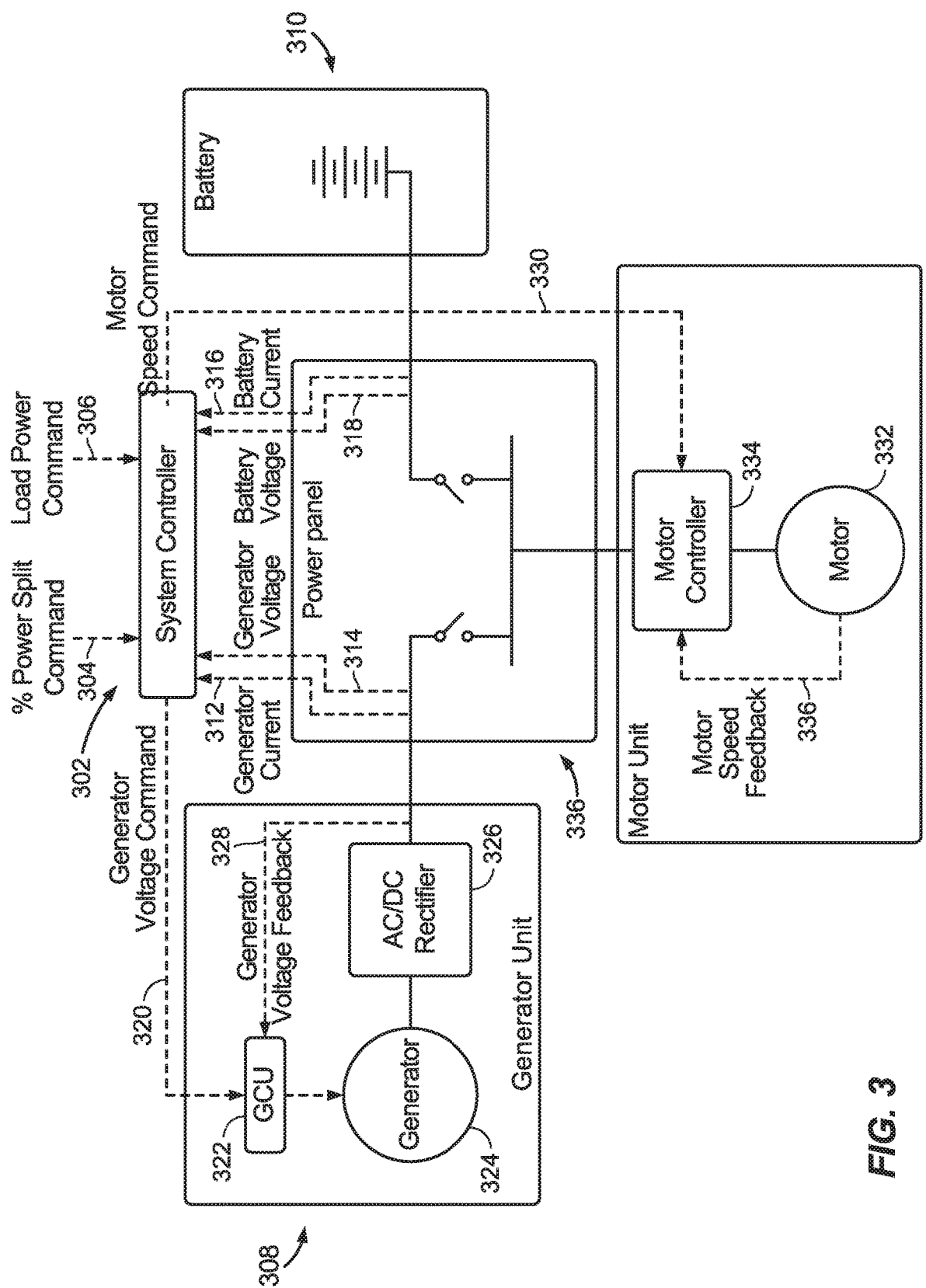
FIG. 3 is an implementation of an example control diagram for a system controller for a series hybrid powertrain.

Continuing now with FIG. 3, which is an implementation of an example control diagram 300 for a system controller for a series hybrid powertrain. Likewise, it should be noted that information acquired and/or produced, such as, for example, input signals, output signals, operations, results, etc. associated with example control diagram 300 may be represented via one or more digital signals. It should also be noted that even though one or more communications and/or operations are illustrated or described concurrently or with respect to a certain sequence, other sequences or concurrent communications and/or operations may be employed. In addition, although the description below references particular aspects and/or features illustrated in certain other figures, one or more operations may be performed with other aspects and/or features. Further, it should be appreciated that control diagram 300 is described herein as a non-limiting example that may be implemented, in whole or in part, in the context of various electronic communications networks or combination of such networks, such as wired networks, wireless networks, etc., or any combination thereof.

Thus, as illustrated, a system controller, referenced at 302, may receive one or more signals indicative of a particular input, such as referenced herein as a command 304 to implement a desired power split and a command 306 to implement desired load power. As was indicated, in some instances, these or like commands may be communicated by and/or received from an aircraft management system responsible for flight planning, flight energy/cost optimization, and/or other higher-level tasks. As also seen, system controller 302 may also receive one or more signals indicative of a particular input, such as from a generated electrical energy source, illustrated herein as a generator unit at 308, and from a stored electrical energy source, illustrated herein as a battery at 310. Input from generator unit 308 may comprise, for example, measured generator current, referenced at 312, and measured generator voltage, referenced at 314. Input from battery 310 may comprise, for example, measured battery current, referenced at 316, and measured battery voltage, referenced at 318.

In an implementation, based, at least in part, on these or like inputs, system controller 302 may perform one or more calculations, such as discussed below, and may communicate one or more appropriate commands to one or more elements or components of a powertrain. For example, as referenced schematically at 320, system controller 302 may calculate and/or set generator voltage and may communicate a command to implement, such as to meet and/or maintain this voltage to a GCU 322 of generator unit 308. Output voltage from a generator 324 may be rectified, such as by an AC/DC rectifier 326, for example, and may be fed back to GCU 322 via a feedback loop, referenced at 328, to be used, at least in part, as a process variable for a voltage control function. Typically, rectifiers comprise electrical devices capable of converting alternating current (AC) to direct current (DC) and are generally known. Here, any suitable AC/DC rectifier may be used.

As illustrated schematically at 330, in an implementation, system controller 302 may also calculate and/or set a speed for an electric motor 332 and may communicate a command to implement, such as to meet and/or maintain such speed to a motor controller 334. Likewise, output motor speed may be measured and fed back to motor controller 334, such as via a control loop 336, for example, to be used, at least in part, as a process variable for a speed control function. It should be noted that, in some instances, a torque command, such as instead of speed command 330, may be implemented herein in a similar manner. For example, system controller 302 may calculate and/or set a required torque value and may use such a value as control input to motor controller 334, such as in a similar manner.

As also illustrated and as discussed above, a power panel, referenced at 336, may control delivery and/or distribution of electric power within an associated hybrid electric powertrain, such as via routing electric power from generator unit 308 and/or battery 310, such as in accordance with a desired power split proportion, for example, to electric motor 332. As was also indicated, system controller 302 may communicate a command to power panel 336 to implement a particular switching configuration, such as via turning on and/or off one or more electrical switches of power panel 336, for example.

Figure 4:
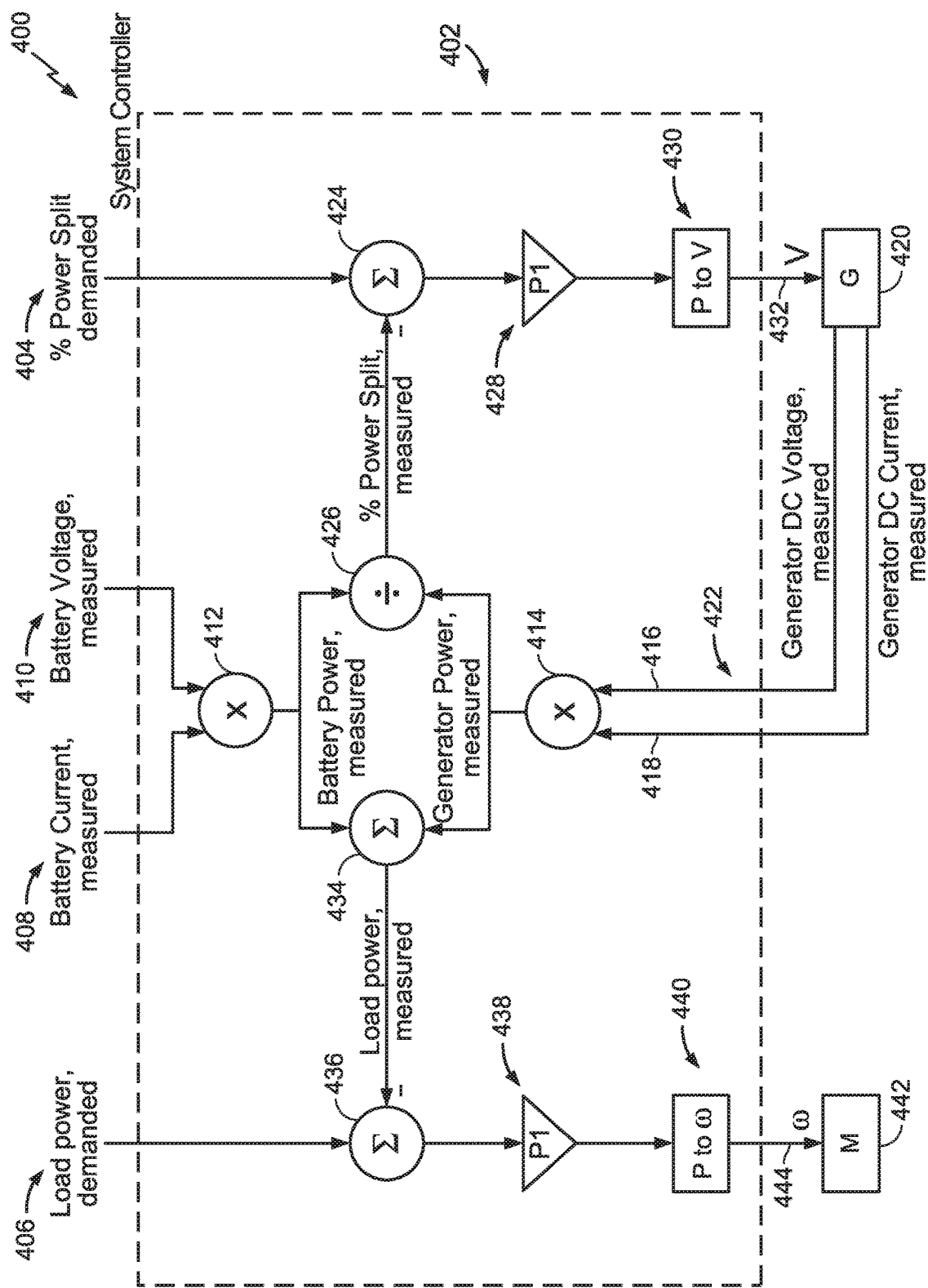
FIG. 4 is a schematic flow diagram illustrating an implementation of an example process for a system controller for a series hybrid powertrain.

FIG. 4 is a schematic flow diagram illustrating an implementation of an example process 400 that may be performed, in whole or in part, to facilitate and/or support one or more operations and/or techniques for a system controller capable of controlling operation of a propulsion powertrain for a hybrid electric aircraft. In some instances, process 400 may be employed, in whole or in part, to implement one or more power commands discussed above, such as communicated via a signal indicative of a particular input from an aircraft management system, for example. Namely, as discussed herein, a system controller 402 may, for example, implement a power split command, referenced at 404, and a load power command, referenced at 406, such as via modifying one or more applicable input variables to achieve desired powertrain performance. It should be noted that information acquired or produced, such as, for example, input signals, output signals, operations, results, etc. associated with example process 400 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, as illustrated in this example implementation, system controller 402, having received a particular input, such as indicative of power split command 404 and load power command 406, for example, may obtain measurements of battery current and battery voltage, referenced respectively at 408 and 410. These or like measurements may, for example, be received as one or more signal sample values from an applicable system-level controller (e.g., BMU 120 of FIG. 1, etc.). For example, in at least one implementation, values for current and voltage from a battery may be measured continually and communicated to system controller 402 in real or near-real time. As referenced at 412, values for measured battery current and voltage may be multiplied, such as to arrive at a measured battery power value, for example. As further referenced at 414, measured output values for voltage 416 and current 418 from a generator 420 may, for example, be multiplied, such as to arrive at a measured generator power value to be used as a process variable in connection with a feedback loop, referenced generally at 422.

Thus, in an implementation, feedback loop 422 may, for example, be used, at least in part, to control voltage, reduce voltage error, etc. on a system controller-level. Namely, via feedback loop 422, generator output power may, for example, be fed back into system controller 402, such as to be used, at least in part, as a process variable for continual summation of a system controller error, such as at operation 424. As such, feedback loop 422 may, for example, facilitate and/or support more dynamic application of an appropriate correction, such as a more responsive and/or optimal correction, for example, to a suitable control function (e.g., voltage setpoint, speed setpoint, etc.) of system controller 402, such as implemented outside of a sub-system-level control loop of a particular generated electrical energy source (e.g., an internal control loop of generator 420, etc.).

As further seen in this particular implementation, measured generator power may be divided by measured battery power, such as at operation 426 to determine resulting power of these energy sources, for example, and a resultant value indicative of measured power split may be fed into a summation operation, referenced at 424, so as to compute the integral sum of error (e.g., via weighted average, etc.) between the measured and demanded power split values. Here, as indicated generally at 428, a resultant value of summation operation 424 may, for example, be fed to and/or utilized by, in whole or in part, a proportional integral (PI) control function or like process, such as to apply an appropriate correction to a generator voltage value. As further referenced at 430, requisite voltage for generator 420 may, for example, be computed, such as utilizing Relation (1) above, and may be outputted for generator 420 to implement, such as to meet and/or maintain, such as via a command 432 by system controller 402.

As further illustrated at 434, appropriate output values, such as for measured generator power and measured battery power may, for example, be inputted into a summation operation so as to compute a value for a measured load power. As referenced at 436, a resultant measured load power value may be summed with an applicable value for demanded load power, for example, and may be fed into a PI control function or process 438 for an appropriate correction, such as in a manner similar to operation 428. At operation 440, an appropriate internal model of an electric motor 442 may, for example, be utilized, such as indicated above, which may allow to input load power and receive a requisite motor speed as output (e.g., since load power is directly related to a motor speed). As further illustrated at 444, a desired motor speed may, for example, be communicated by system controller 402 to be implemented, such as met and/or maintained by electric motor 432.

Figure 5:
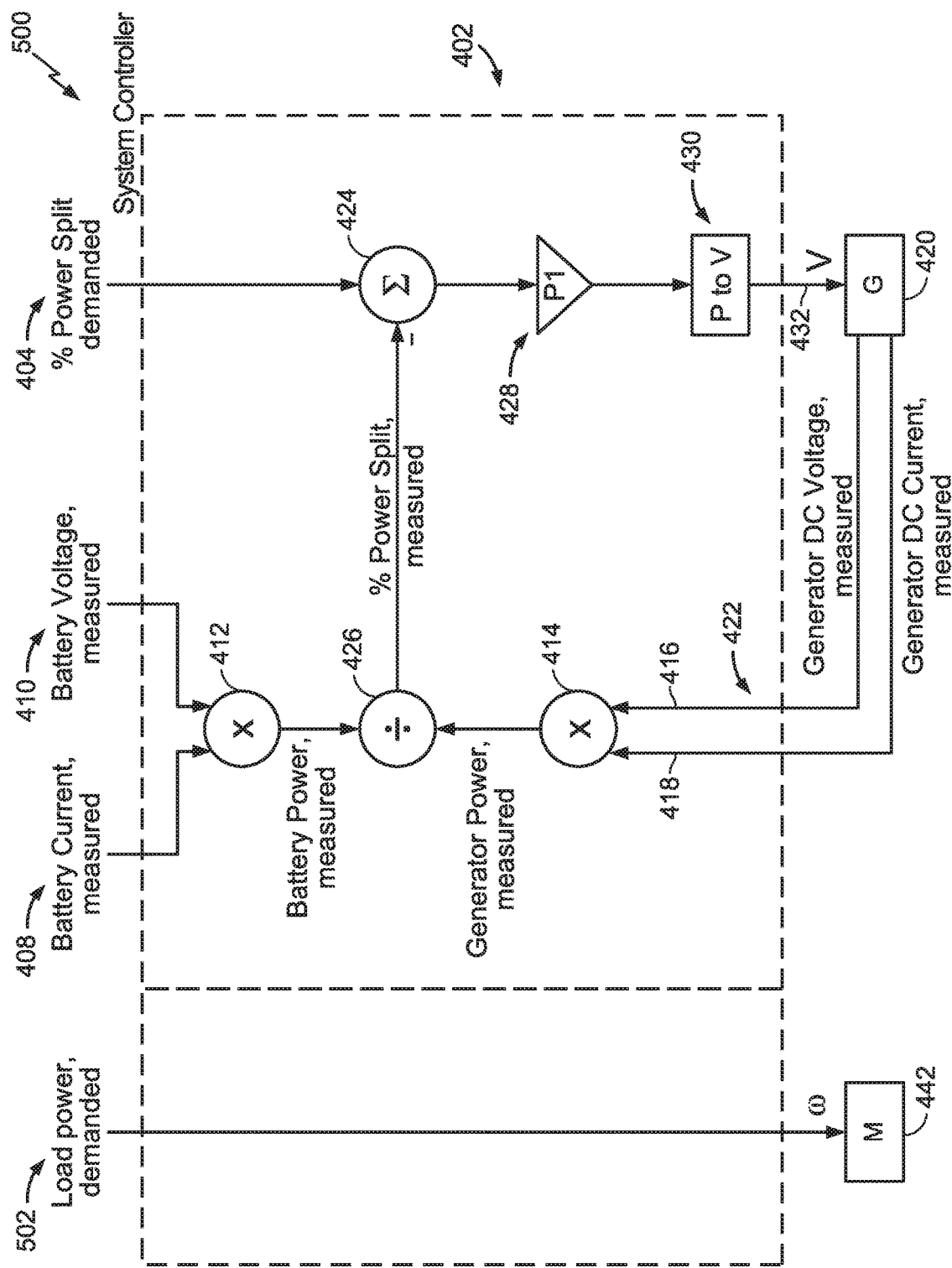
FIG. 5 is a schematic flow diagram illustrating another implementation of an example process for a system controller for a series hybrid powertrain.

FIG. 5 is a schematic flow diagram illustrating an implementation of another example process 500 that may be performed, in whole or in part, to facilitate and/or support one or more operations and/or techniques for a system controller capable of controlling operation of a propulsion powertrain for a hybrid electric aircraft. In some instances, process 500 may be employed to implement one or more commands, such as communicated via a signal indicative of a particular input, for example, which may include a command for a particular speed at a load, referenced at 502. Likewise, here, it should be noted that information acquired or produced, such as, for example, input signals, output signals, operations, results, etc. associated with example process 500 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

As seen, at times, example process 500 may, for example, be similar to example process 400, such as with respect to implementing a demanded power split command, referenced similarly at 404. For example, here, similarly to example process 400, system controller 402 may receive a number of inputs, such as indicative of a demanded power split, measured battery current and voltage, and measured generator current and voltage, referenced herein using like numerals 404, 408, 410, 416, and 418, respectively. Likewise, these inputs may be used, in whole or in part, to determine resulting power as feedback, generate an error function using output generator power as a process variable, apply a control function (e.g., PI, PID, etc.), and calculate requisite generator voltage (e.g., via Relation (1), etc.), such as referenced using like numerals and in a manner similar to example process 400.

As was also indicated and as referenced at 502, in some instances, a signal indicative of a particular input may comprise, for example, a command for a particular speed at a load, such as electric motor 442, just to illustrate one particular implementation. Depending on an implementation, a demanded load speed may be commanded by an aircraft management or like system, such as communicated directly to an applicable sub-system-level controller (e.g., motor controller 126 of FIG. 1, etc.) of electric motor 432, for example, or via system controller 402. I such a case, system controller 402 may receive and/or acknowledge such a command and, may provide a demanded load speed value to an appropriate sub-system-level controller to implement, such as using its own internal control operations and/or processes (e.g., an internal control loop, etc.). As such, here, an aircraft management or like system may, for example, monitor a response to its speed command on a higher-lever and may adjust speed of electric motor 432 accordingly.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

In the context of the present disclosure, the term "network device" refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

The term "electronic file" and/or the term "electronic document" or the like are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

As was indicated, in the context of the present disclosure, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Figure 6:
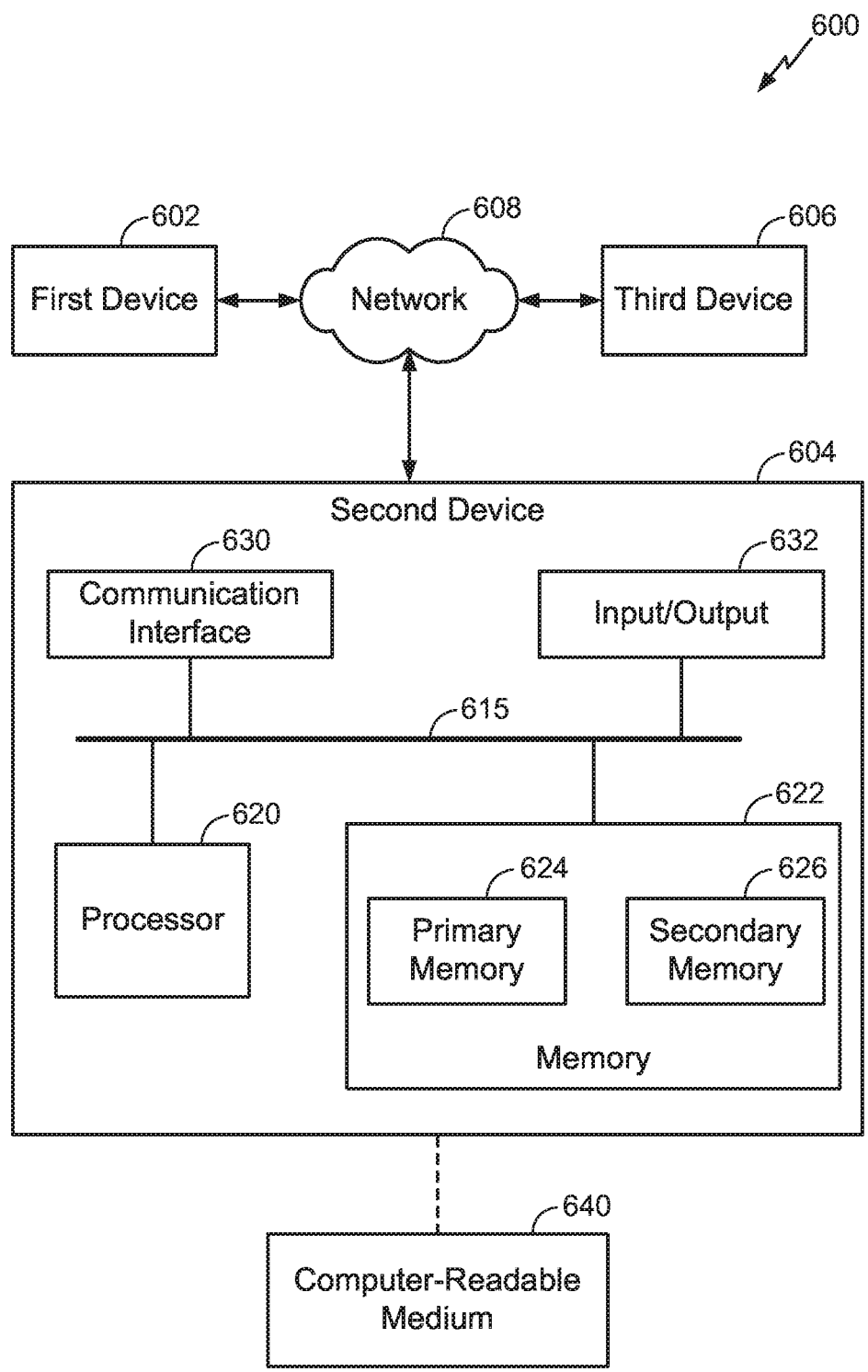
FIG. 6 is a schematic diagram illustrating an implementation of an example computing environment.

In one example embodiment, as shown in FIG. 6, a system embodiment may comprise a local network (e.g., a second device 604 and a computer-readable medium 640) and/or another type of network, such as a computing and/or communications network. For purposes of illustration, therefore, FIG. 6 shows an embodiment 600 of a system that may be employed to implement either type or both types of networks, such as in connection with one or more operations and/or techniques for implementing a system controller for a series hybrid powertrain, such as for propulsion of a hybrid electric aircraft, for example. Network 608 may comprise one or more network connections, links, processes, services, applications, and/or resources to facilitate and/or support communications, such as an exchange of communication signals, for example, between a computing device, such as 602, and another computing device, such as 606, which may, for example, comprise one or more client computing devices and/or one or more server computing device. By way of example, but not limitation, network 608 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 6 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device" and/or similar terms; however, if it is determined, for some reason not immediately apparent, that the foregoing understanding cannot stand and that 35 § USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1 and 3 of the present disclosure.

As further illustrated in FIG. 6, in an embodiment, first and third devices 602 and 606 may be capable of rendering a graphical user interface (GUI) for a network device and/or a computing device, for example, so that a user-operator may engage in system use. Device 604 may potentially serve a similar function in this illustration. Likewise, in FIG. 3, computing device 602 ('first device' in figure) may interface with computing device 604 ('second device' in figure), which may, for example, also comprise features of a client computing device and/or a server computing device, in an embodiment. Processor (e.g., processing device) 620 and memory 622, which may comprise primary memory 624 and secondary memory 626, may communicate by way of a communication bus 615, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 604, as depicted in FIG. 3, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

In FIG. 6, computing device 602 may provide one or more sources of executable computer instructions in the form physical states and/or signals (e.g., stored in memory states), for example. Computing device 602 may communicate with computing device 604 by way of a network connection, such as via network 608, for example. As previously mentioned, a connection, while physical, may not necessarily be tangible. Although computing device 604 of FIG. 6 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 622 may comprise any non-transitory storage mechanism. Memory 622 may comprise, for example, primary memory 624 and secondary memory 626, additional memory circuits, mechanisms, or combinations thereof may be used. Memory 622 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 622 may be utilized to store a program of executable computer instructions. For example, processor 620 may fetch executable instructions from memory and proceed to execute the fetched instructions. Memory 622 may also comprise a memory controller for accessing device readable-medium 640 that may carry and/or make accessible digital content, which may include code, and/or instructions, for example, executable by processor 620 and/or some other device, such as a controller, as one example, capable of executing computer instructions, for example. Under direction of processor 620, a non-transitory memory, such as memory cells storing physical states (e.g., memory states), comprising, for example, a program of executable computer instructions, may be executed by processor 620 and able to generate signals to be communicated via a network, for example, as previously described.

Memory 622 may store electronic files and/or electronic documents, such as relating to one or more users, and may also comprise a device-readable medium that may carry and/or make accessible content, including code and/or instructions, for example, executable by processor 620 and/or some other device, such as a system controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Continuing with FIG. 6, processor 620 may comprise one or more circuits, such as digital circuits, to perform at least a portion of a computing procedure and/or process. By way of example, but not limitation, processor 620 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 620 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 6 also illustrates device 604 as including a component 632 operable with input/output devices, for example, so that signals and/or states may be appropriately communicated between devices, such as device 604 and an input device and/or device 604 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method of controlling an operation of a series hybrid powertrain via a system controller, the series hybrid powertrain comprising a plurality of system elements to provide propulsive power to a hybrid electric aircraft, the plurality of system elements including at least one electric motor to drive an associated propeller and/or ducted fan, wherein the at least one electric motor is electrically coupled to a power panel powered by a plurality of energy sources electrically coupled to the power panel, the plurality of energy sources comprising at least one generated electrical energy source and at least one stored electrical energy source, the method comprising:
   receiving, as a command from the hybrid electric aircraft, a signal indicative of a particular input;
   receiving, as sampled values from the plurality of system elements, one or more signals indicative of one or more additional inputs;
   determining one or more measurements of resulting power for the plurality of energy sources based, at least in part, on the one or more additional inputs; and
   utilizing the one or more measurements of resulting power as feedback to concurrently deliver electrical power from the at least one generated electrical energy source and the at least one stored electrical energy source to provide the propulsive power and so as to maintain a proportion of electrical power concurrently delivered from between the at least one generated electrical energy source and the at least one stored electrical energy source determined based, at least in part, on the one or more measurements.

2. The method of claim 1, wherein delivery of the electrical power to provide the propulsive power is implemented via the power panel.

3. The method of claim 1, wherein the signal indicative of the particular input comprises a desired power split value indicative of the proportion of the electrical power concurrently delivered from between the at least one generated electrical energy source and the at least one stored electrical energy source.

4. The method of claim 1, wherein the one or more signals indicative of the one or more additional inputs comprise values representing measured parameters of the plurality of energy sources.

5. The method of claim 1, wherein the at least one generated electrical energy source comprises a power generator and the at least one stored electrical energy source comprises a battery.

6. The method of claim 1, wherein the proportion is further determined based, at least in part, on a correction applied to the particular input.

7. The method of claim 6, wherein the correction is at least partially applied via internal control loops of the plurality of energy sources.

8. The method of claim 1, and further comprising employing the one or more measurements of resulting power as a process variable to adjust the proportion of electrical power concurrently delivered from between the at least one generated electrical energy source and the at least one stored electrical energy source.

9. The method of claim 1, and further comprising calculating a voltage setpoint value for at least one of the plurality of energy sources based, at least in part, on the proportion.

10. The method of claim 9, and further comprising generating a signal comprising a command to implement the calculated voltage setpoint value.

11. The method of claim 1, wherein the plurality of system elements comprise sub-system-level controllers operable to implement one or more commands from the system controller for the controlling the operation of the series hybrid powertrain.

12. The method of claim 1, and further comprising determining whether the power panel is configured in a particular switching configuration based, at least in part, on the proportion.

13. The method of claim 1, and further comprising generating a signal comprising a command to change a switching configuration of the power panel based, at least in part, on the determined proportion.

14. The method of claim 1, wherein the command from the hybrid electric aircraft comprises a command from an aircraft management system of the hybrid electric aircraft.

15. An apparatus comprising:
a system controller capable of controlling an operation of a series hybrid powertrain, the series hybrid powertrain comprising a plurality of system elements to provide propulsive power to a hybrid electric aircraft, the plurality of system elements including at least one electric motor to drive an associated propeller and/or ducted fan, wherein the at least one electric motor to be electrically coupled to a power panel in a switching configuration, and wherein the at least one electric motor to be powered by a plurality of energy sources to be coupled to the power panel, the plurality of energy sources to comprise at least one generated electrical energy source and at least one stored electrical energy source, the system controller adapted to:
receive, as a command from the hybrid electric aircraft, a signal indicative of a particular input;
receive, as sampled values from the plurality of system elements, one or more signals indicative of one or more additional inputs;
determine one or more measurements of resulting power for the plurality of energy sources based, at least in part, on the one or more additional inputs; and
utilize the one or more measurements of resulting power as feedback to concurrently deliver electrical power from the at least one generated electrical energy source and the at least one stored electrical energy source to provide the propulsive power and so as to maintain a proportion of electrical power concurrently delivered from between the at least one generated electrical energy source and the at least one stored electrical energy source determined based, at least in part, on the one or more measurements.

16. The apparatus of claim 15, wherein the system controller is further to employ the resulting power as a process variable to adjust the proportion.

17. The apparatus of claim 15, wherein the system controller is further to calculate a voltage setpoint value for at least one of the plurality of energy sources based, at least in part, on the proportion.

18. A non-transitory storage medium having instructions executable by a processor to:
receive, as a command from a hybrid electric aircraft, a signal to be indicative of a particular input;
receive, as sampled values from a plurality of system elements, one or more signals to be indicative of one or more additional inputs;
determine one more measurements of resulting power for a plurality of energy sources based, at least in part, on the one or more additional inputs, the plurality of energy sources to comprise at least one generated electrical energy source and at least one stored electrical energy source; and
utilize the one or more measurements of resulting power as feedback to concurrently deliver electrical power from the at least one generated electrical energy source and the at least one stored electrical energy source to provide propulsive power to a hybrid electric aircraft and so as to maintain a proportion of electrical power concurrently delivered from between the at least one generated electrical energy source and the at least one stored electrical energy source determined based, at least in part, on the one or more measurements.

19. The non-transitory storage medium of claim 18, wherein the instructions further comprise instructions to calculate a voltage setpoint value for at least one of the plurality of energy sources based, at least in part, on the proportion.

20. The method of claim 6, wherein the correction is applied outside of an internal control loop of the generated electrical energy source.

21. The method of claim 3, and wherein the desired power split value defines delivery of power such that at least ten percent of power is delivered from the at least one generated electrical energy source while at least ten percent of power is delivered from the stored electrical energy source.

22. The method of claim 1, and further comprising:
determining the proportion of electrical power concurrently delivered from between the at least one generated electrical energy source and the at least one stored electrical energy source based, at least in part, on a sum of a ratio of power delivered from the at least one generated electrical energy source and power delivered from the at least one stored electrical energy source over a time history.

23. The apparatus of claim 15, and wherein the controller is further adapted to determine the switching configuration subject to one or more safe operating limits.

* * * * *